Nov. 16, 1965   H. A. ROY, SR   3,218,026
PLUG VALVE HAVING RENEWABLE SEALING INSERTS
Filed March 28, 1963

*Inventor*
Henry A. Roy, Sr
By his Attorney
Vincent A. White

United States Patent Office 3,218,026
Patented Nov. 16, 1965

3,218,026
PLUG VALVE HAVING RENEWABLE SEALING INSERTS
Henry A. Roy, Sr., Peabody, Mass., assignor to Quality Controls Company, Inc., Malden, Mass., a corporation of Massachusetts
Filed Mar. 28, 1963, Ser. No. 268,674
1 Claim. (Cl. 137—317)

This invention relates generally to valves and more particularly is directed to a top loaded plug type valve.

Plug valves have a distinct advantage over valves of other types in that they generally by their nature are top loaded. This means that the working parts of the valve may be easily removed from or assembled with the valve body without disconnecting pipes or conduits, thereby greatly facilitating maintenance. However, many of the plug valves presently available for one reason or another have a variety of undesirable characteristics which are causing this type of valve to fall into disfavor.

To illustrate some of the disadvantages of plug valves in general, one known as the lift type is provided with a tapered plug which fits a correspondingly tapered bore. To avoid close fitting, the plug is often encased in rubber or like material. To open and close the valve, the plug is first raised from its seated position before rotation between open and closed positions. After rotation, the plug must be once again lowered into its sealing position. This type of valve requires a rather complex actuating mechanism, making the valve expensive to manufacture and difficult to maintain in proper operating condition. Another plug valve known as the lubricated type has a straight plug which is ground to a close tolerance to fit a straight sided bore in the valve body. While this valve may be simpler to operate, it requires that a special lubricant frequently be forced between the plug and the wall of the bore to prevent leakage. A more common type of valve known as the plug cock valve has a tapered plug that is lapped to conform closely to a correspondingly tapered bore to avoid leakage. This type also is expensive to manufacture and is easily fouled by corrosion which renders it difficult if not impossible to operate and still prevent leakage.

Accordingly, it is a general object of this invention to provide an inexpensive plug type valve which retains the desirable characteristics of such valves while overcoming the usual disadvantages and which in addition is substantially superior to many other types of valves of much greater complexity. According to one feature, the valve of the present invention is provided with inlet and outlet ports which are intersected by a straight sided bore. A plug is fitted in the bore without close tolerances. In fact it is preferable that the plug be fitted to permit a limited free floating action. For closing the ports, the plug is provided with semi-cylindrical sealing members inset in the sides of the plug sufficient to cover the ports. In one rotative position of the plug, the sealing members close the ports. In another rotative position, the sealing members are out of engagement with the ports permitting communication between the ports through a passage either in the plug or in the valve body.

According to another feature of the invention, the plug and the sealing members are provided with mating surfaces which are held in engagement by the wall of the bore for preventing dislodgement of the sealing members during rotation of the plug. This eliminates any need for the sealing members to be specially fastened into the plug.

The above and other features of the invention, together with novel details of construction and various combinations of parts will now be described with particular reference to the accompanying drawings, in which.

Figure 1:
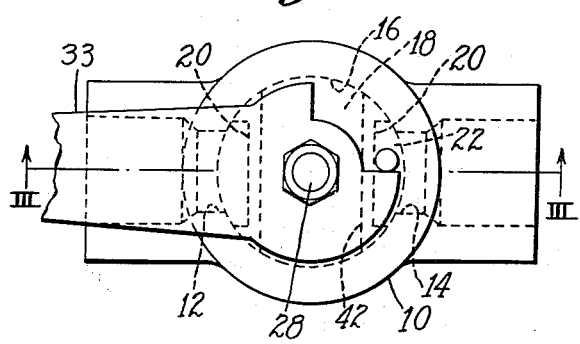
FIG. 1 is a plan view of a valve embodying the present invention, showing the plug in closed position.

The valve structure comprises a single piece body portion 10 of any material suitable for the type of fluid to be controlled. The body is provided with inlet and outlet ports 12 and 14, the outer ends of which are suitably machined for the desired type of connection of the valve in a pipeline. Such connections may include internal or external threads, flanges, soldered joints and other suitable end connections as desired. The ports 12 and 14 communicate with an intersecting circular bore 16 which receives a cylindrical plug 18. The plug is provided with two longitudinal grooves 20, each of which receives a mating surface of a sealing member 22. Each member 22 is so formed that the plug and sealing members together form a cylindrical shape. The diameter of the plug itself is not fitted closely to that of the bore so as to have a limited free floating action.

The lower end of the plug is provided with a pilot 24 received in a hole 26 coaxial with the bore 16 to guide the plug in its rotative movements. The upper end of the plug is provided with a stem 28 which extends through a removable bonnet 30 threaded into the upper end of the bore 16. An O-ring 32 is provided to prevent external leakage of fluid from the valve, but is should be understood that any suitable sealing means could be utilized for this purpose. For rotating the plug manually between open and closed positions, the stem has secured thereto a handle 33. However, to provide for automatic operation of the valve, other suitable actuating means could be provided.

Figure 5:
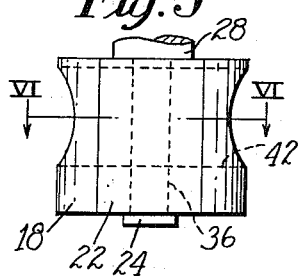
FIGS. 5 through 10 show three alternate plug constructions.
Figure 7:
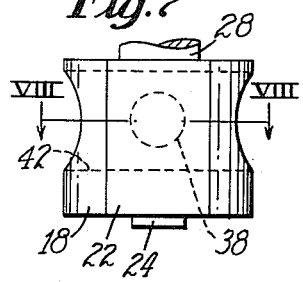
Figure 9:
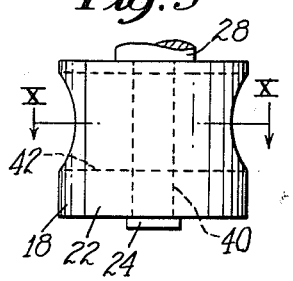
Figure 6:
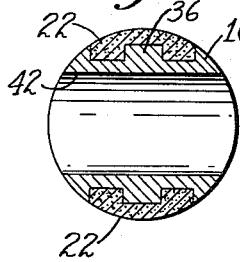
Figure 8:
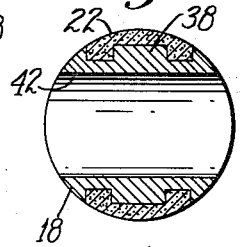
Figure 10:
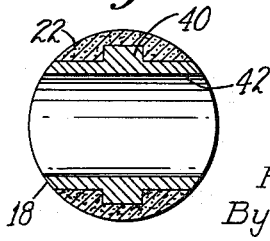

The sealing members 22 of the plug may be either resilient or non-compressible and may be of any material suited to the fluid material to be handled. When made of non-compressible material, the sealing members may be closely fitted to the bore diameter. However when made of resilient material, the sealing members preferably are oversized so as to be compressed by the wall of the bore 16 for effective sealing of the ports. Where a free floating action of the plug is desired, the pilot 24 and hole 26 are loosely fitted so that one sealing member is forced more firmly against its associated port by the differential of fluid pressure in the pipes leading to the ports. However, for high pressure conditions the plug usually is not permitted a free floating action and compression of the sealing members effectively seals the ports. The mating surfaces of the plug and sealing members are held in engagement by the wall of the bore thus preventing dislodgement of these parts without the necessity of special fastening means. Alternate forms for the mating surfaces are shown in FIGS. 5 through 10. The construction of the sealing members 22 and the mating surfaces 20 of the plug in FIGS. 1 to 4 provide side support for the members to prevent undue distortion and also a smooth imperforate inner wall backing up the flat inner face of the member 22. FIGS. 5 and 6 show alternate constructions which provide a tang 36 for additional location for the sealing member. FIGS. 7 and 8 provide another alternate construction having a pilot 38 for locating means. FIGS. 9 and 10 show a further alternate construction having a tang 40 for location but not having side lips where side support for the sealing member is not necessary. It should be understood that other forms of mating surfaces could be utilized in addition to the above and still be within the contemplated scope of the invention as stated in the claims.

Figure 4:
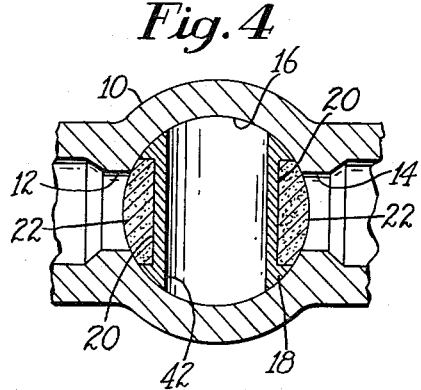
FIG. 4 is a section substantially on line IV—IV of FIG. 3.
Figure 3:
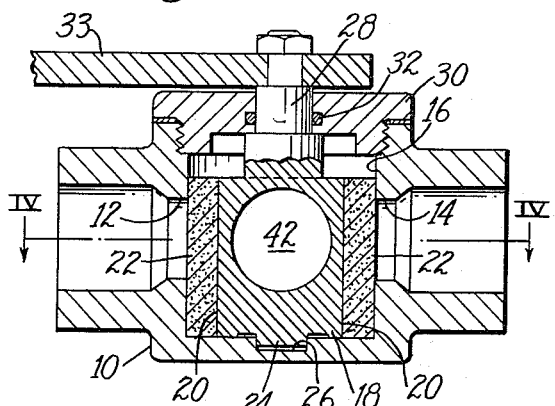
FIG. 3 is a section substantially on line III—III of FIG. 1.
Figure 2:
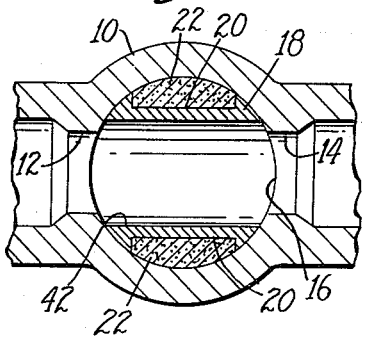
FIG. 2 is a view similar to FIG. 1 but with the upper part of the valve broken away and showing the plug in open position.

The groove 20 is shown in FIGS. 2 and 4 as segmental in cross section and defined by longitudinal edge walls that extend for the full length of the plug 18 from top to bottom. These walls therefore form a slideway or pocket in which may be fitted one of the solid sealing members 22, as by sliding it into the groove from either the top or bottom of the plug. The sealing member 22 has a semi-cylindrical outer wall and is bounded by parallel side walls that make sliding engagement with the longitudinal walls of the open groove 20. The sealing member is of compressible resilient material and the radius of curvature of its cylindrical outer wall is slightly greater when unconfined than the radius of the valve chamber 16.

The plug 18 is provided with a passage 42 which furnishes communication between the ports 12 and 14 when the plug is in the open position as shown in FIG. 2. When the plug is rotated to the position shown in FIG. 1, the sealing members 22 close the ports against passage of fluid. It should be understood that rather than having a passage in the plug for communication between the ports, passageways could be provided in the valve body itself to serve the same purpose without departing from the scope of the invention.

Having thus described my invention, what I claim as novel and desire to secure by Letters Patent of the United States is:

In a valve, a cylindrical plug having in its circumferential face a longitudinal groove of substantial width which extends for the full length of the plug from top to bottom and has a flat perpendicular imperforate inner wall which is bounded by parallel edge walls, in combination with a sealing member of resilient material having a flat perpendicular inner face and an outer semi-cylindrical face parallel to said inner face and bounded by side walls which make sliding fit with the edge walls of the groove thus enabling sliding insertion of the sealing member into the plug by axial movement until an end surface of the sealing member is brought flush with the end of the plug and the inner wall of the sealing member permanently fitted against the imperforate wall of the plug.

References Cited by the Examiner
UNITED STATES PATENTS

| 1,569,285 | 1/1926 | Katona | 251—175 |
| 2,201,895 | 5/1940 | Glen | 251—172 X |
| 2,844,353 | 7/1958 | Gurries | 251—317 X |
| 2,868,499 | 1/1959 | Kaminsky | 251—314 |

FOREIGN PATENTS

| 523,174 | 10/1953 | Belgium. |
| 1,158,357 | 1/1958 | France. |
| 1,062,512 | 7/1959 | Germany. |

ISADOR WEIL, *Primary Examiner.*

CLARENCE R. GORDON, *Examiner.*